US012590480B2

(12) United States Patent
Chouinard et al.

(10) Patent No.: US 12,590,480 B2
(45) Date of Patent: Mar. 31, 2026

(54) COMPACT POWERED DOOR LATCH

(71) Applicant: Outlier Campers LLC, Cambridge, MA (US)

(72) Inventors: Pascal Chouinard, Laval (CA); Steeven Gilbert, Montreal (CA); Martin Payette, Laval (CA)

(73) Assignee: Outlier Campers LLC, Cambridge, MA (US)

( * ) Notice: Subject to any disclaimer, the term of this patent is extended or adjusted under 35 U.S.C. 154(b) by 287 days.

(21) Appl. No.: 18/484,747

(22) Filed: Oct. 11, 2023

(65) Prior Publication Data

US 2024/0175302 A1 May 30, 2024

Related U.S. Application Data

(60) Provisional application No. 63/428,664, filed on Nov. 29, 2022.

(51) Int. Cl.
*E05B 83/44* (2014.01)
*E05B 81/08* (2014.01)
(Continued)

(52) U.S. Cl.
CPC .............. *E05B 83/44* (2013.01); *E05B 81/08* (2013.01); *E05B 81/16* (2013.01); *E05B 81/25* (2013.01); *E05B 81/28* (2013.01)

(58) Field of Classification Search
CPC ............. E05B 17/2088; E05B 47/0696; E05B 47/0046; E05B 47/06; E05B 47/0607; E05B 2047/0084; E05B 2047/0085; E05B 2047/0088; E05B 63/12; E05B 63/24; E05B 63/244; E05B 63/246; E05B 63/248; Y10T 292/696; Y10T 292/699; Y10T 292/702
See application file for complete search history.

(56) References Cited

U.S. PATENT DOCUMENTS 4,116,027 A 9/1978 Tannery
4,529,234 A 7/1985 Senften
(Continued)

FOREIGN PATENT DOCUMENTS

| | | |
|---|---|---|
| JP | 4957293 | 6/2012 |
| KR | 100256175 | 5/2000 |
| WO | 2021156497 | 8/2021 |

OTHER PUBLICATIONS

Amazon.com, "Mecclien Electronic Door Lock" retrieved online: <https://www.amazon.in/dp/B07XY64TNV/ref=sspa_dk_detail_1?psc=1&pd_rd_i=B07XY64TNV&pd_rd_w=Eyfy1&content-id=amzn1.sym.2d591cad-b72c-4edb-a913-c75b0cb961d6&pf_rd_p=2d591cad-b72c-4edb-a913-c75b0cb961d6&pf_rd_r=3PD9H7BKYRZPPR3XAMVR&pd_rd_wg=vQ0kA&pd_rd_r=4b7f0d10-d6bf-44aa-8eae-1c7617176bdf&s=home-improvement&sp_csd=d2lkZ2V0TmFtZT1zcF9kZXRhaWw>, 5 pages.
(Continued)

*Primary Examiner* — Christine M Mills
*Assistant Examiner* — Yahya Sidky
(74) *Attorney, Agent, or Firm* — Fox Rothschild LLP

(57) ABSTRACT

Provided is a door latch comprising a frame piece and door piece. The frame piece may include a lever comprising a lever connector; an actuator comprising an actuator connector; a cylinder comprising an arm; and a catch configured to be moved by the lever connector, the actuator connector and the arm. The door piece may include a bolt configured to laterally slide between the frame piece and the door piece, thereby transitioning the door latch between an unlatched position and a latched position.

21 Claims, 13 Drawing Sheets

(51) Int. Cl.

| | |
|---|---|
| ***E05B 81/16*** | (2014.01) |
| ***E05B 81/24*** | (2014.01) |
| ***E05B 81/28*** | (2014.01) |

(56) References Cited

U.S. PATENT DOCUMENTS

| | | | | |
|---|---|---|---|---|
| 4,805,723 | A | 2/1989 | Aoki et al. | |
| 6,701,761 | B1 | 3/2004 | Chang et al. | |
| 7,698,918 | B2 | 4/2010 | Geringer et al. | |
| 10,378,237 | B2 | 8/2019 | Bacon et al. | |
| 10,968,660 | B2 | 4/2021 | Maiga et al. | |
| 2016/0002959 | A1 | 1/2016 | Javadzadeh et al. | |
| 2018/0016810 | A1* | 1/2018 | Bacon | E05B 81/66 |
| 2021/0047871 | A1* | 2/2021 | Riley | E05C 21/00 |
| 2021/0189769 | A1* | 6/2021 | Sieglaar | E05B 63/0056 |
| 2021/0355710 | A1* | 11/2021 | Schroeder | E05B 63/24 |

OTHER PUBLICATIONS

Amazon.com, "Hawk Vision Stainless Steel Polished Security with Comfort Electronic Lock (Silver)," retrieved online: <https://www.amazon.in/Hawk-Vision-Stainless-Security-Electronic/dp/B08KZVP3WX/ref=sr_1_6?keywords=Electronic+Door+Lock&qid=1667801054&qu=eyJxc2MiOiI1Ljk1IiwicXNhljoiNS41OCIsInFzcCI6IjIuNzcifQ%3D%3D&sr=8-6>, 7 pages.

"Karim Nice ""How Power Door Locks Work,"" retrieved online: <https://auto.howstuffworks.com/power-door-lock2.htm>, HowStuffWorks.com, 2 pages (2000)".

* cited by examiner

COMPACT POWERED DOOR LATCH

CROSS-REFERENCE TO RELATED APPLICATION

The application is based on and claims priority to U.S. Provisional Application No. 63/428,664, filed Nov. 29, 2022, which is expressly incorporated herein by reference thereto.

TECHNICAL FIELD

Embodiments of the present invention generally relate to a compact powered door latch comprising a frame piece and door piece.

DESCRIPTION OF RELATED ART

Powered automotive door locks may be locked or unlocked by either electronic wireless remote, electronic switch or button, electronic keypad, cell phone app, or manually by key.

Automotive powered door locks also operate off the main vehicle battery rather than requiring dedicated batteries. However, powered automotive door locks often have cables, rods, and/or wires running through the door because the interior handle, exterior handle, latch, and motor are often separate components in different locations on the door and/or frame. This makes automotive door lock systems much too bulky and cumbersome for thinner camper panel wall applications. Often, it's sufficient and preferable for the latching mechanism, interior and exterior levers and handles, latches, and motor to be proximate to each other on camper, motorhome, or truck cap door openings. Many keyless or electronic RV entry systems are designed this way however, they require that the electronic components be installed on the door side, since they act on the door side of the deadbolt, further requiring wiring through doors or require dedicated, proximately located batteries. Furthermore, keyless RV entry systems often have 2 bolts: a latch bolt and a deadbolt, like a residential door latch. The latch deadbolt can be manually retracted for opening of the door or automatically catches when the door is closed (e.g., a spring-loaded slanted bolt that may allow a door to be simply pushed closed and then manually retracted by lever, handle, or knob from inside or outside to open).

The RV keyless entry system also contains a deadbolt that is manually operated by key, or electronically by button, keypad, remote, or phone app. Because many RV keyless entry systems have two bolts, require proximately located batteries on the door side, or require wiring through the door, they also are too cumbersome and heavy for thinner shelter walls such as those on collapsible rooftop campers; Most powered or manual RV latches are designed for walls that are greater than 1 inch thick. Also, RV latches often contain handles, levers, and/or buttons that protrude significantly from the exterior and/or interior surfaces of the doors to which they're attached, making them unsuitable for folding panels. Some small enclosure or cabinet latches can be controlled electronically, but even if some may be compact enough for thin camper wall applications, most do not have the ability to be locked/unlocked manually from inside the cabinet, making them unsafe for habitable enclosures. It would be beneficial for a latch that can be electronically lockable and unlockable without a key; can be manually lockable and unlockable with a key from outside; can be manually lockable and unlockable without a key from inside; combines the latch bolt and the deadbolt into a single bolt; has all its electronics on the frame side as opposed to the door side; is lightweight, compact, and can fit doors, walls, and/or panels less than 1 inch (e.g., % inches) thick; and is relatively flat with minimal to no protrusions on either side of the door. Currently available automotive and RV keyless latches are too heavy and cumbersome for many thin doors, walls, and/or panel openings; their overall dimensions make them unsuitable for folding panels; and cabinet or small enclosure latches are not suitable for habitable enclosures. Having a much more compact powered unit (i.e., a unit that is keyless, keyed, and manually operable from inside) that can connect to an external or main power supply, is lightweight, can fit thinner camper walls, and does not protrude much or at all, would be highly beneficial for use in many travel trailer, rooftop camper, truck cap, truck camper, and motorhome door openings, especially for ones that fold.

SUMMARY OF THE INVENTION

A compact powered door latch, that is both automatic and keyed and has an interior manual latch suitable for use in campers, motorhomes, or other habitable, enclosed spaces that require a flat, compact, and lightweight door latch. A powered door latch that can be operated by switch, button, keypad, wireless remote, or cell phone app; locked or unlocked by key from outside; locked or unlocked by manual lever from inside; opened by interior or exterior lever or handle; contains all electronics on the frame side (i.e., strike plate side) rather than the door side (i.e., does not require wiring through the door or batteries stored on the door); combines the operation of a latch bolt and deadbolt into one bolt; can fit doors or panels less than 1 inch (e.g., % inches) thick; is contained in a relatively flat and compact unit with minimal to no protrusions on the inside and/or outside of the door such that it can be fitted to collapsible campers is described herein. It may be beneficial for a person to be able to lock and unlock a door, window, or other opening on a habitable shelter that has thin walls (e.g., walls that are % inches or less than 1 inch thick) by using a latch that may be controllable without a key (i.e., keyless entry) (e.g., by wireless remote, wired remote, switch, button, electronic keypad, or cell phone app). It would further be beneficial for the same latch to be lockable or unlockable by key, in case of power loss or failure or electronic malfunction. Furthermore, it would be crucial for safety reasons for said latch to be manually lockable and unlockable from the inside of a habitable shelter without the need for either power or a key. It would also be beneficial if said latch unit did not require wiring, batteries, or any electronics on the door side; It would be preferable for the electronics to be installed on the frame side (i.e., strike plate side) instead for simpler wiring and so that the latch may not need its own batteries. This is especially important for collapsible campers so that wiring is not run through multiple, folding partitions and bulky batteries do not take up space on the door. And particularly for doors or openings on folding panels and/or are thin panels, it would be beneficial for the latch to have minimal to no protrusions on the interior and/or exterior side. All the features of the compact, powered door latch may be contained in a unit small and light enough that it may be mounted to relatively thin camper, automotive, or shelter walls and openings, particularly where overall dimensions and weight are concerns. It would be beneficial for all the methods of locking and unlocking (i.e., electronically locking and unlocking, manual locking and unlocking from outside by key, and manual locking and unlocking from inside by lever or button) the latch and opening and closing the door or window (i.e., manually retracting the deadbolt by lever or handle to open the door) to be acting upon the same, single bolt mechanism to achieve a more compact, lighter-weight design without the need for both a latching bolt and a lockable deadbolt, and/or a relatively large motor. The compact, powered door latch described herein has all the electronic components located on the frame side of the door, does not require its own dedicated power supply, has a single bolt that can be used for latching and can be held captive for locking or released for unlocking by 3 mechanisms: 1) electronic solenoid controllable by wired or wireless means; 2) exterior keyed cylinder; or 3) interior lever; and does not have levers or handles that protrude or protrude significantly so that it may fit folding camper walls less than 1 inch (e.g., % inches) thick.

The compact powered door latch described herein has a single bolt mechanism that is manipulated by a solenoid, exterior keyed cylinder, and interior latch. Rather than these mechanisms acting on the bolt from the door side, they all act on the same bolt, by either holding it captive or releasing it, from the frame side, allowing all wires and electronic components to be located off the moving door and on the frame side of the opening, thereby making it easier to connect the latch to the camper, motorhome, or shelter's main power supply. This also allows for a much lighter and more compact powered latch that can fit thin (i.e., % inches or less than 1 inch thick) walls and is suitable for habitable enclosures. The design of the compact powered door latch also has no protrusions on the interior side of the latch and has minimal to no protrusions on the exterior side of the latch, depending on wall thickness (e.g., there may not be any exterior protrusions on walls 2 inches thick or less).

The main components of the door-side of the compact powered door latch may simply be the spring-loaded bolt which is connected to an interior and exterior lever or handle, neither of which protrudes past the latch housing. When no force is exerted on the spring, its resting position would cause the bolt to be fully extended out of the door side, like the operation of latch bolts on many types of door latches. The side of the bolt facing the door frame when the door is being closed may be slanted such that when it strikes the frame or strike plate, it is retracted into the door, allowing the door to fully close. Then the spring may pull the bolt fully out of the door side and into the frame side. The side opposite the slanted side of the bolt may be straight allowing it to catch on the strike plate or frame holding the door closed or in a latched position, until the spring-loaded bolt is manually retracted, allowing the door to open or putting it in an unlatched position. An exterior handle or lever and an interior handle or lever may be directly attached to the bolt and may be used to retract the bolt, freeing it from the frame side of the door, which may allow the door to open. This operation is typical of latch bolts on many types of door latches. However, the latch bolt on the compact powered door latch may contain a notch, groove, or hole that can be grabbed by a catch on the frame side to hold it captive for locking purposes, also making it a deadbolt. This simple configuration allows the door-side of the latch to move freely with the door, without being hindered by wires or cables and does not require any power supply to the door side. Both the exterior and interior handles and levers of the compact powered door latch are recessed into the housing so that neither protrudes beyond the housing, which will protect the latch as well as other objects it may come in contact with if installed on a folding panel.

The main components of the compact powered door latch on the frame or strike plate side of the opening may be a door lock solenoid with simple, linear motion; wiring to connect the solenoid to a power supply; a keyed cylinder, accessible from outside the camper or shelter; a manual, locking lever that is recessed into the latch housing and accessible from inside the camper or shelter; and a catch to hold the bolt captive or release it. With the door closed, the spring-loaded bolt attached to the door side of the latch will be fully extended into the side of the latch that is in the door frame or wall. With the bolt inside this portion of the latch, three (3) mechanisms (e.g., electronic door lock solenoid, keyed cylinder, and interior lever) may work together or not interfere with each other to lock or unlock the door by acting on the same catch that may be used to hold the bolt captive or release it, respectively. Connectors connecting the door lock solenoid and the interior lever may be attached such that they move and act on the catch together to prevent the bolt from being retracted or cause it to be free. The door lock solenoid's linear motion in one direction to a first position may cause the catch to enter the groove, notch, or hole located in the bolt, thereby holding it captive and preventing the bolt from being retracted and the door from being opened. Movement in the opposite direction of the solenoid to a second position may cause the catch to exit the groove, notch, or hole in the bolt, allowing the bolt to be retracted from the frame side of the latch and the door opened. A connector connecting the interior, recessed lever to the same catch would also cause the lever to move as the door lock solenoid is moved from a locked to an unlocked position and vice versa. The door may be locked by also moving the interior lever into one position, which may cause the connector attached to the catch to move the catch into the groove, notch, or hole in the bolt, holding it captive and preventing the door from being opened. The interior lever may be moved in the opposite direction into a second position causing the connector to move the catch out of the groove, notch, or hole in the bolt, freeing the bolt and allowing it to be retracted, so that the door may be opened. As mentioned above, since the interior lever is connected to the same catch that the door lock solenoid is connected to, any movement of the interior lever would also cause the door lock solenoid to move and vice versa. A third mechanism acting on the same catch that the interior lever and door lock solenoid are attached to can cause both the door lock solenoid and interior lever to enter either locked or unlocked positions by use of a key. A dual spring-loaded, keyed cylinder may have 2 main positions that can move the catch to either hold the bolt captive or release it. A third, neutral position of the keyed cylinder may allow free movement of the catch, so that it may be acted upon by either the door lock solenoid or the interior lever. In this neutral, default position the keyed cylinder may provide a range of motion for the catch and connectors connecting it to the door lock solenoid and the interior lever, thereby allowing the door lock solenoid and interior lever to lock or unlock the door without interference. However, if manual locking or unlocking from outside is required, turning the keyed cylinder (e.g., by inserting the key into it) to one position will move the catch and all components connected to it the unlocked position, removing the catch from the groove, notch, or hole in the bolt allowing the bolt to be retracted. Then release of the key, will allow the springs to return the keyed cylinder to its neutral position where it leaves the catch in unlocked position and does not further move it. By turning the key in the opposite direction, the keyed cylinder will act on the catch and all components connected to it by moving the catch into the groove, notch, or hole in the bolt, holding it captive. Similarly, when the key is released, the springs will cause the keyed cylinder to return to its neutral position where it may not further affect movement of the catch or any components connected to it.

The compact powered door latch allows three (3) different mechanisms—the door lock solenoid, the interior lever, and the keyed cylinder—to act on the same single catch mechanism that may hold the single bolt in either locked position or allow it to be free. This reduces the number of components required to operate the lock and thereby reduces its size, weight, and complexity yet still allows the compact powered door latch to be operated electronically, by key, or manually from inside. And the electronic components of the latch are located on the non-moving frame side of the door, allowing it to be connected to a main power supply without wiring through the door. This compact design with no electronic components on the door side of the latch makes it ideal for applications with thin walls such as campers; trailers, including travel trailers; motorhomes; and habitable shelters. Recessing the interior locking lever into the latch housing also eliminates any protrusions on the interior side and the keyed cylinder also does not protrude from the exterior side. Especially for collapsible campers such as rooftop campers that may have thin, folding walls, the compact powered door latch allows the addition of keyless entry. Where aesthetics may be a consideration, the compact powered door latch may be fully recessed into the wall panels, depending on wall panel thickness, or may have only a minimal protrusion and only on the exterior side, offering a sleeker, more aerodynamic look.

Figure 1:
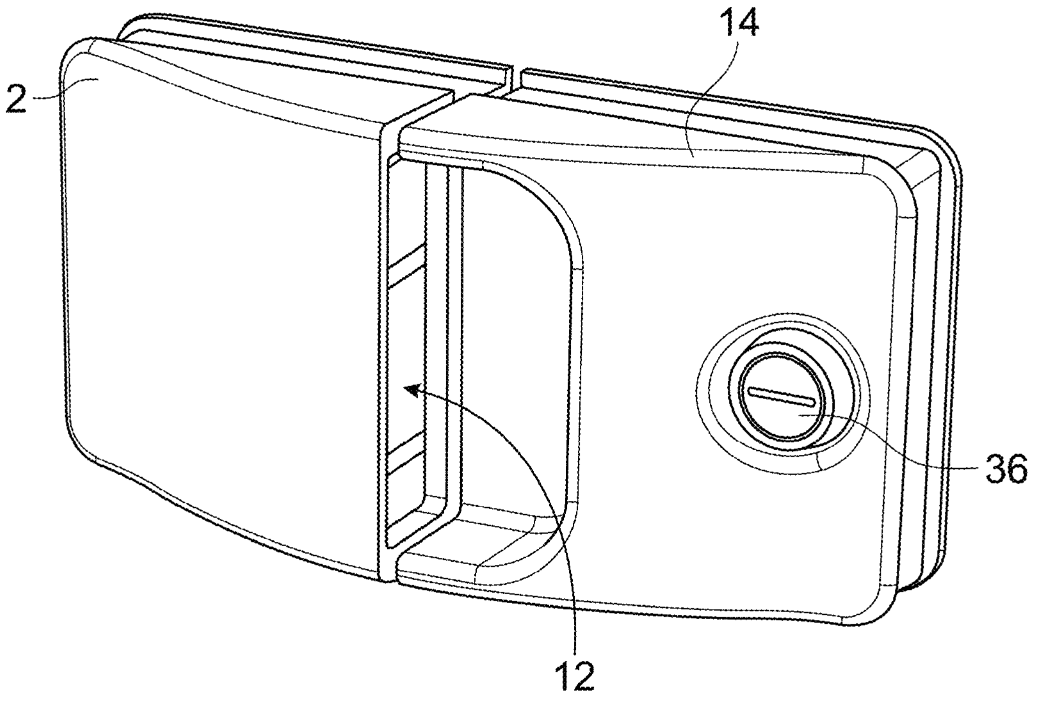
FIG. 1 shows an exterior prospective view of an exemplary compact powered door latch.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Described herein are devices, components, assemblies, systems, methods, etc, for compact powered door latches. The description and accompanying figures, which describe and show certain embodiments, are made to demonstrate, in a non-limiting manner, several possible configurations of compact powered door latches, apparatuses, components, assemblies, systems, etc. and various methods of using them according to various aspects and features of the present disclosure. Accordingly, the disclosure is not limited to the specific embodiments described. Rather, the inventive principles associated with the embodiments described herein, including with respect to the apparatuses, devices, components, assemblies, systems, methods, etc. described herein, may be applied in a variety of ways, including to other types of apparatuses, devices, components, assemblies, systems, methods, etc. General and specific apparatuses, devices, components, assemblies, systems, methods, etc. are described herein sufficiently to enable one to develop a variety of implementations/applications without undue experimentation. In the development of particular applications, numerous implementation-specific decisions will be made to achieve the design-specific goals, which will vary from one implementation/application to another. It will be appreciated that, having access to this disclosure and reading this disclosure, such a development effort would be a routine undertaking for persons of ordinary skill in the art.

This document does not intend to distinguish between components that differ in name but not function. In the following discussion and in the claims, the terms “including,” “includes,” “comprising,” “have,” and “has” are used in an open-ended fashion, and thus should be interpreted to mean “including, but not limited to.” The word “or” is used in the inclusive sense (i.e., “and/or”) unless a specific use to the contrary is explicitly stated, FIG. 1 shows an exterior prospective view of an exemplary compact powered door latch 1. As shown in FIG. 1, door piece 2 is that portion of compact powered door latch 1 that may be fixed to the door side of a door opening. Door piece 2 may be comprised of an outer exterior cover that may be made of plastic, metal, composite material, or a combination of materials. As shown in FIG. 1, door piece 2 may house handle 12 on its exterior facing side that may, when pressed or pushed, be used to unlatch compact powered door latch 1, as explained in detail below. Handle 12, as shown in FIG. 1, is fully recessed into the housing of the compact powered door latch so that no portion of it protrudes beyond the housing. Handle 12 may be comprised of metal, plastic, composite material, or a combination of materials and may include a seal to prevent ingress of water. As also shown in FIG. 1, frame piece 14 is that portion of compact powered door latch 1 which may be fixed to the frame or wall side of a door opening. Frame piece 2 may be comprised of an outer exterior cover that may be made of plastic, metal, composite material, or a combination of materials that may or may not be like the material used to construct door piece 2. Frame piece 14 may contain on its exterior side, as shown in FIG. 1, keyhole 36, which may be used to lock or unlock compact powered door latch 1 with a key as explained in detail below. Frame piece 14 may also contain an indentation that may allow a person space to insert his or her fingers in order to access handle 12 on door piece 2. Both door piece 2 and frame piece 14 may contain a seal or gasket between its exterior cover and the door, door frame, and/or wall, which may be comprised of rubber or some similar material that may form a seal between those exterior portions of compact powered door latch 1 and the door, frame, and/or wall preventing water intrusion.

FIGS. 2-13 show an interior prospective view of the inside of compact powered door latch 1, illustrating details of its main internal components as well as levers for manual latching and locking operations, accessible from inside a camper. The interior sides of door piece 2 and frame piece 2 may each contain covers (not shown in these figures) that may conceal the internal components leaving exposed components such as the recessed levers for manual operation. Those covers may be comprised of metal, plastic, composite material, or a combination of materials. For purposes of illustration of the internal components, door piece 2 and frame piece 14 are shown without any covers on the interior facing sides in FIGS. 2-13.

As visible in FIGS. 2-13, door piece 2 may further contain bolt 4, which may be a cylindrical component made of metal, plastic, composite material, or a combination of materials that may serve as a latching bolt to keep the door to which door piece 2 is attached in closed or latched position, as further explained below. Bolt 4 may sit inside a cylindrical opening in door piece 2 that may allow lateral movement between latched and unlatched positions as explained below. Bolt 4 may be slanted at one end and on the side of the bolt facing the interior side of the door which may allow it to hit strike plate 16 on frame piece 14 causing bolt 4 to be pushed back into door piece 2 and allowing the door to fully close, as further explained below. On the same end of bolt 4 that contains the slant, yet on the opposite side of the slant (i.e., the side of the bolt facing the exterior of the door), bolt 4 may have a straight edge. When bolt 4 is extended through an opening in strike plate 16, the straight edge of bolt 4 may prevent it from accidentally sliding out of strike plate 16, unless a force is applied to purposely retract the bolt, as further explained later. Bolt 4 may contain notch 6 toward its slanted end that may be a notch, gap, groove, indentation, cavity, hole, or other space that a portion of catch 18 may enter, to hold bolt 4 captive as explained below. Bolt 4 may be further attached to door piece 2 by spring 8. Spring 8 may be a metal or plastic spring that may be fixed on one end to door piece 2 and fixed on the other end to bolt 4. This may allow bolt 4 to slide laterally inside its cylindrical cavity from a resting position (latched) to a position requiring a small application of force (unlatched) as explained in detail below. Bolt 4 may be attached to lever 10, which may be made of metal, plastic, composite material, or a combination of materials, and may or may not include a cover for a more comfortable grip. Lever 10 is also recessed into door piece 2 and accessible through an opening in the cover (not shown) on the interior side of door piece 2 so that it may not protrude on the interior facing side of the latch. Lever 10 may be used to retract bolt 4 for unlatching of compact powered door latch 1 as explained below. Bolt 4 may also be fixed on the exterior facing side of door piece 2 to handle 12, not shown in FIGS. 2-13, which may also be used to retract bolt 4 for unlatching as further explained below.

Also shown in FIGS. 2-13 are the internal components of frame piece 14. Frame piece 14 may contain strike plate 16, that may be used to push bolt 4 by its slanted portion back into door piece 2 to fully close the door, as previously mentioned. An opening in strike plate 16 may allow bolt 4 to slide back into frame piece 14 once the door to which compact powered door latch 1 is closed, as mentioned. Strike plate 16 may be comprised of metal, plastic, composite material, or a combination of materials. Located near strike plate 16 may be catch 18, which may be made of metal, plastic, composite material, or a combination of materials. Catch 18 may contain a tooth-shaped portion on one end that may fit into notch 6 in bolt 4, as described previously, and shown in FIGS. 2-13. As also shown, catch 18 may be pivotally fixed to frame piece 14, to allow that portion that may fit into notch 6 to move into and out of that cavity for locking and unlocking of compact powered door latch 1 as described in detail below. Frame piece 14 may further contain solenoid 20 fixed to it, which may be an electronic solenoid with a rod at the end capable of linear movement when a current is applied to it. Solenoid 20 may be fixed to connector 22 on one end and connector 22 may be pivotally fixed to catch 13 toward its other end, as shown in FIGS. 2-13. Connector 22 may be comprised of metal, plastic, composite material, or a combination of materials. When current is applied to solenoid 20, it may cause the rod fixed to connector 22 to move laterally, thereby causing catch 18 to pivot upward or downward for locking and unlocking procedures as described in detail below. Frame piece 14 may further contain lever 24, which may be made of metal, plastic, composite material, or a combination of materials, and may or may not include a cover for a more comfortable grip. Lever 24 is recessed into the latch housing and accessible through an opening in the interior facing side of the latch cover (not shown in FIGS. 2-13) so that it may not protrude on the interior side of the latch housing. Lever 24 may be pivotally fixed to frame piece 14, as shown in FIGS. 2-13. Lever 24 may contain a portion, connector 26, that may also be pivotally and loosely fixed to catch 18, as shown in FIGS. 2-13. The joint between connector 26 and catch 18 may allow for both pivoting and sliding movement of both components. Lever 24 may be used to pivot catch 13 upward or downward for locking and unlocking of compact powered door latch 1 as further explained below.

Frame piece 14 further contains components of a keyed system to lock and unlock compact powered door latch 1. That portion of the keyed system, keyhole 36, that extends to the exterior side of frame piece 14 was previously shown in FIG. 1. That portion of the keyed system extending into the interior side of frame piece 14 is shown in FIGS. 2-13. Cylinder 28, which may accept a key, extends from the exterior side into the interior side of frame piece 14 and may be comprised of metal, plastic, composite material, or a combination of materials which may also contain an O-ring, seal, or gasket to prevent water intrusion from the exterior side of frame piece 14. As shown in FIGS. 2-13, cylinder 28 may be connected to arm 30, which may be a plate made of metal, plastic, composite material, or a combination of materials. Arm 30 may be a C-shaped member with an upper and lower portion. The upper and lower bounds of arm 30 may encompass portions of connector 26 and catch 18, as shown in FIGS. 2-13. As also shown in FIGS. 2-13, each of springs 32 and 34, which may be made of metal or plastic, is fixed on one end to frame piece 14 and fixed on the other end to arm 30. Springs 32 and 34 may cause arm 30, and by extension cylinder 28, to rest in a neutral position when no force is exerted on the cylinder. As explained in detail below, this neutral position may allow a certain amount of movement of those portions of catch 18 and connector 26 that are encompassed by arm 30, as shown. When cylinder 28 is turned by key, arm 30 may act upon those portions of catch 18 and connector 26 that are within its bounds which may cause catch 18 to pivot upward or downward for locking and unlocking, respectively, of compact powered door latch 1, as described below.

As already mentioned, compact powered door latch 1 may contain various components used in latching and locking a door. As mentioned, compact powered door latch 1 may be electronically locked or unlocked by wired or wireless remote, button, switch, keypad, or cell phone app which may all control solenoid 20. Alternatively, compact powered door latch 1 may be locked or unlocked manually from outside by use of a key inserted into cylinder 28. From inside, compact powered latch 1 may be locked or unlocked by use of lever 24. All three (3) methods of locking and unlocking compact powered latch 1 may cause catch 18 to either hold bolt 4 captive to lock the door or release it to unlock the door, so that it may then be unlatched and opened, if desired. Details of how each method works and how they may work together on the same bolt is described in detail below.

Figure 2:
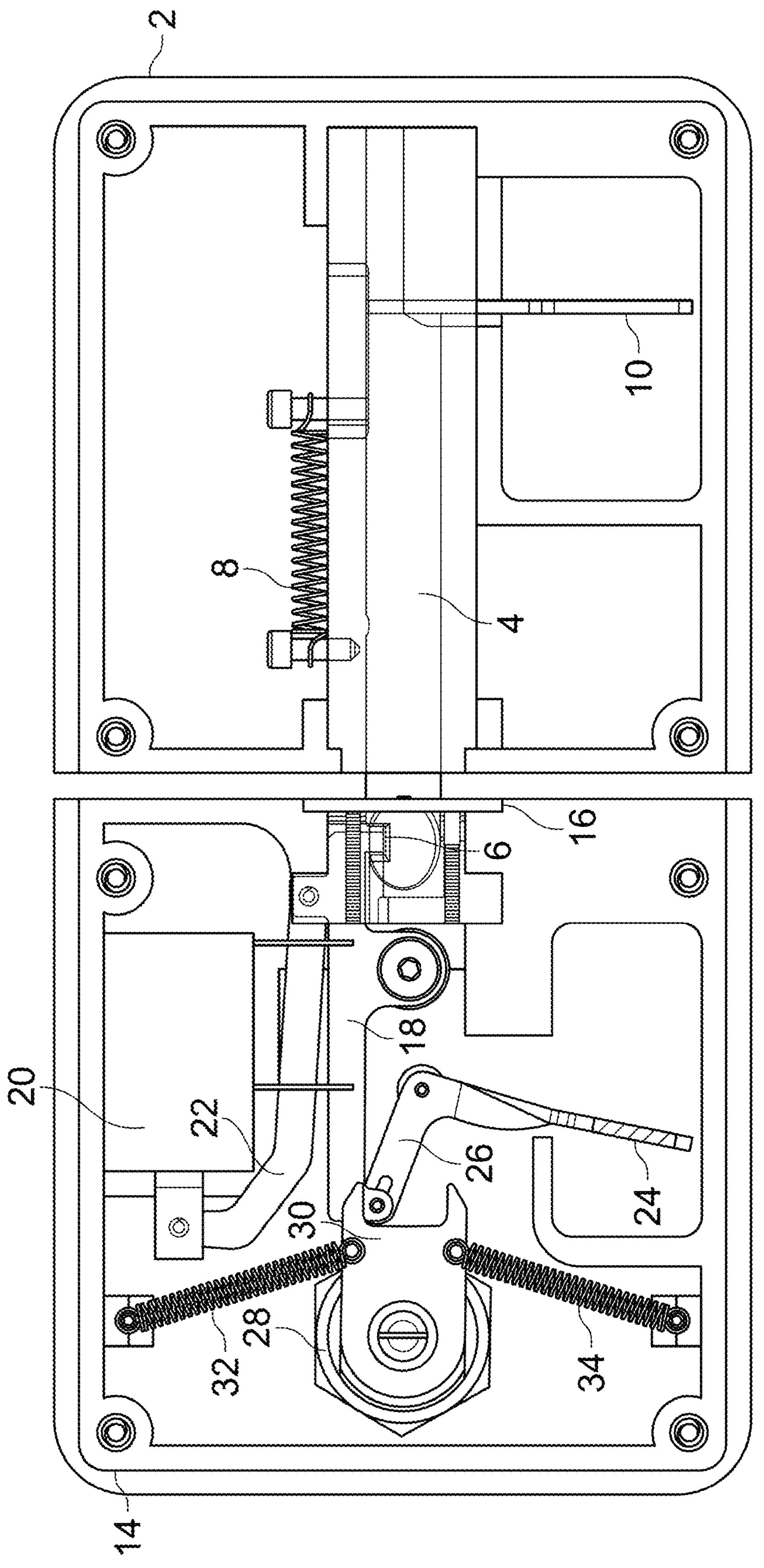
FIG. 2 shows an interior prospective view of the inside of the compact powered door latch of FIG. 1 in locked position.

When compact powered door latch 1 is latched and locked (i.e., the door is closed, latched so that it does not swing open, and locked so that it cannot be unlatched), bolt 4 in door piece 2 is fully extended out of door piece 2, fully extended into frame piece 14, and held captive, as shown in FIG. 2. Bolt 4's default position when no force is exerted on it, is fully extended between door piece 2 and frame piece 14, latching the door in closed position, whether the latch is locked or unlocked. Bolt 4 is held in that position by bolt spring 8, as shown in FIG. 2. Compact powered door latch 1 is in locked position when bolt 4 is held captive in frame piece 14 by catch 18 inserted into notch 6, as shown in FIG. 2. In this position bolt 4 may not be retracted by lever 10, as shown in FIG. 2, or by handle 12, as previously shown in FIG. 1, to open the door.

To unlock compact powered door latch 1 so that the door may be opened, catch 18 must release bolt 4.

Figure 3:
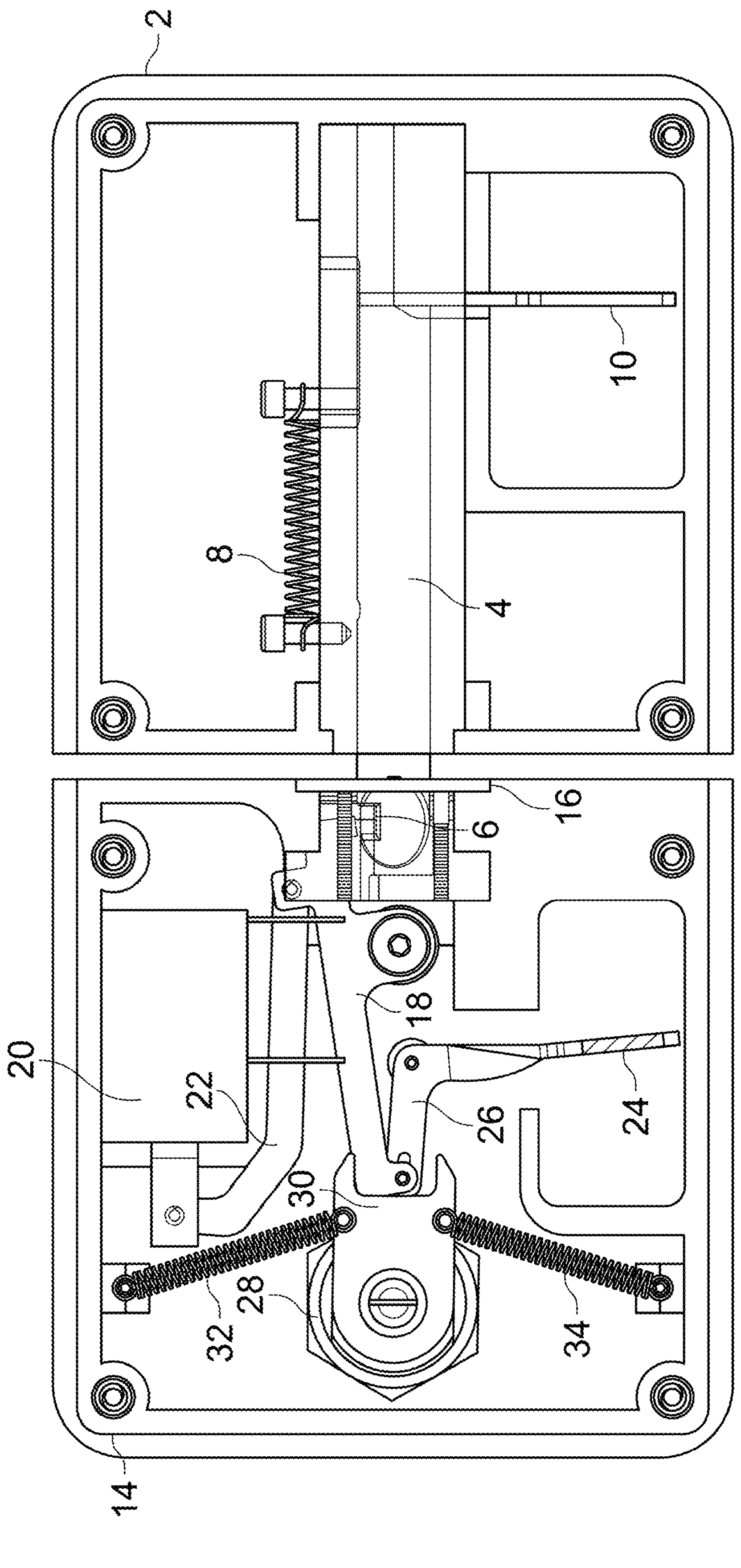
FIG. 3 shows an interior prospective view of the inside of the exemplary compact powered door latch of FIG. 1 in transition from locked to unlocked position by use of a solenoid or lever.
Figure 4:
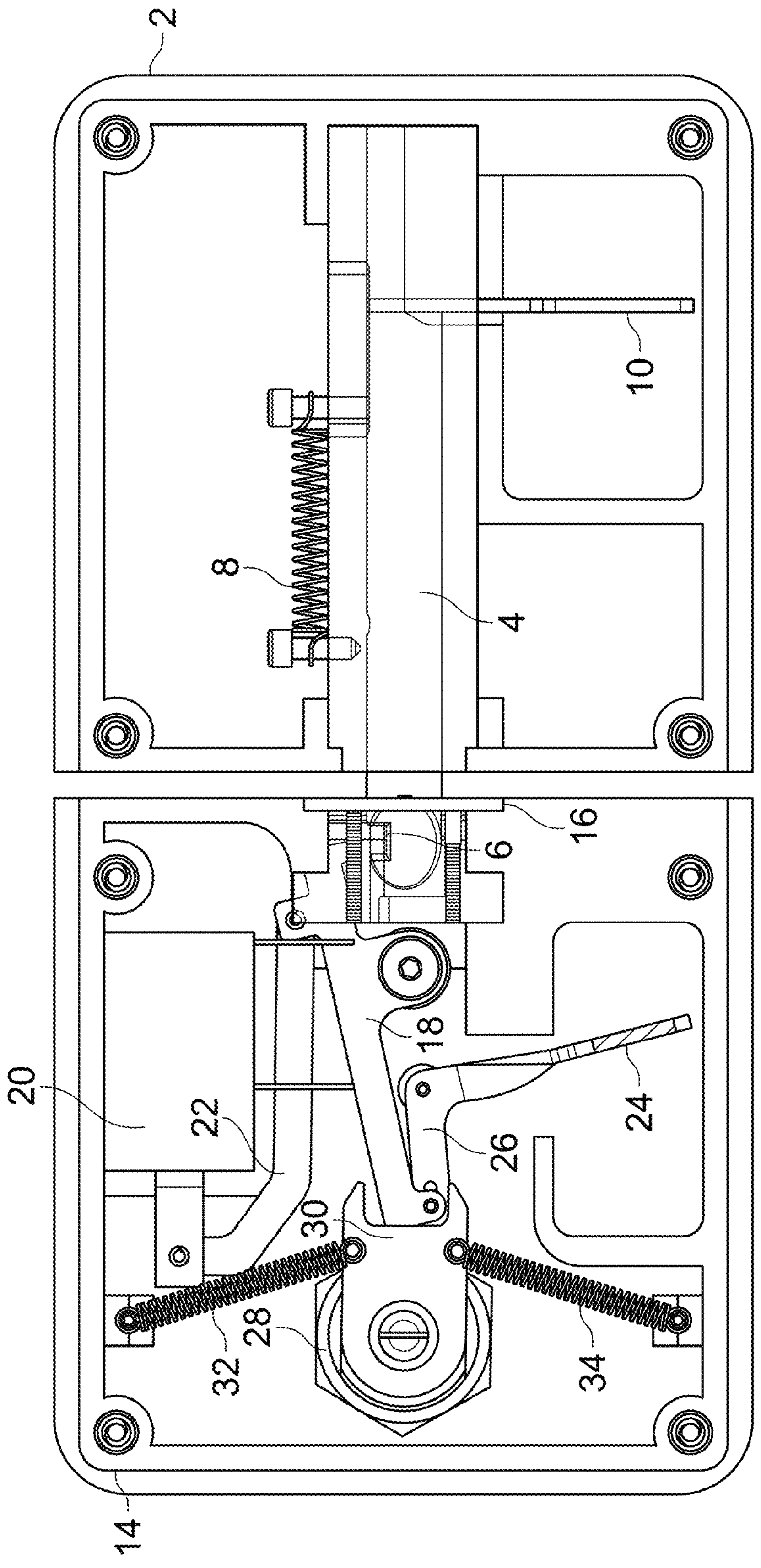
FIG. 4 shows an interior prospective view of the inside of the exemplary compact powered door latch of FIG. 1 in unlocked position.
Figure 5:
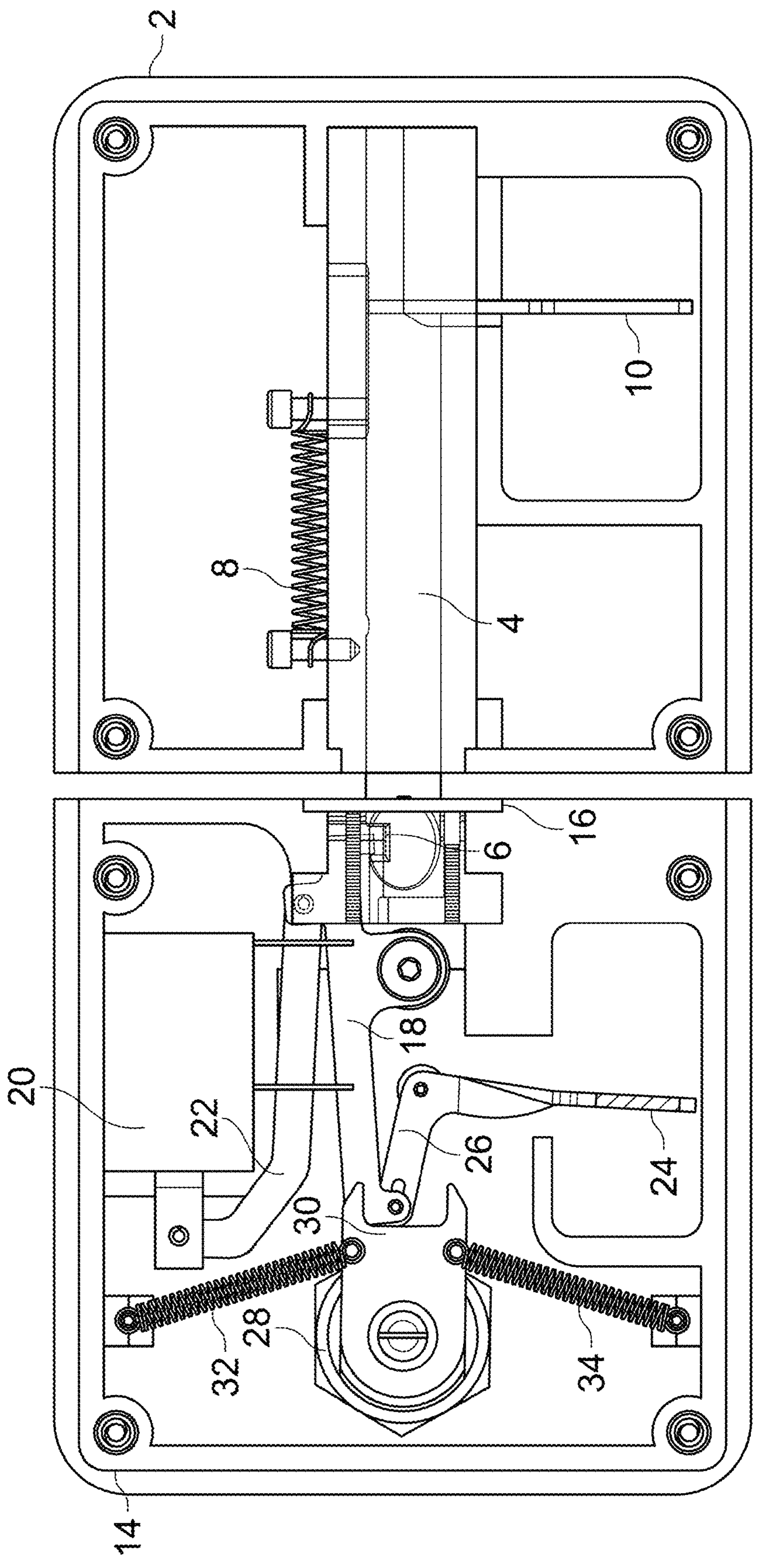
FIG. 5 shows an interior prospective view of the inside of the exemplary compact powered door latch of FIG. 1 in transition from unlocked to locked position by use of a solenoid or lever.

As shown in FIGS. 2 and 3, in frame piece 14, solenoid 20 is pivotally fixed by connecter 22 to catch 18 which is also pivotally and loosely fixed to connector 26 that is in-turn attached to or a part of lever 24. As shown in transition in FIG. 3, catch 18 in frame piece 14 may begin to release bolt 4 in door piece 2 by moving out of notch 6. This may be done electronically when solenoid 20 extends its rod to the left causing connector 22 to lift catch 18, as shown in transition in FIG. 3. Or unlocking may be done manually by moving lever 24 to the right, which may cause connector 26 to also lift catch 18, as also shown in transition in FIG. 3. Movement of solenoid 20 will cause lever 24 to also move and vice versa, and movement of either solenoid 20 or lever 24 will cause movement of catch 18 through their respective connectors, connectors 22 and 26. Once either solenoid 20 or lever 24 has caused catch 18 to release bolt 4, compact powered door latch 1 is in unlocked position as shown in FIG. 4. With compact powered door latch 1 unlocked, bolt 4 may be retracted by either lever 10 or handle 12 to begin unlatching, as shown in transition in FIG. 12 and shown fully unlatched in FIG. 13 to allow opening of the door.

Similarly, compact powered door latch 1 may be locked either electronically or manually. By reversing the motions described earlier of either solenoid 20 or lever 24, compact powered door latch 1 may be locked. By moving solenoid 20's rod to the right, which may be fixed by connector 22 to catch 18, catch 18 will lower toward notch 6 in bolt 4, as shown in transition FIG. 5. This will simultaneously cause lever 24 fixed by connector 26 to catch 18 to move to the left. Alternatively, lever 24 may be manually moved to the left causing catch 18, through connector 26, to lower as shown in transition in FIG. 5, This will also simultaneously cause solenoid 20's rod, connected to catch 18 by connector 22, to move to the right. By either solenoid 20 moving fully to the right or lever 24 moving fully to the left, catch 18 may be lowered into notch 6 in bolt 4, causing bolt 4 to be held captive and putting compact powered door latch 1 in a locked position, as shown previously in FIG. 2. In this position, neither lever 10 nor handle 12 may be able to retract bolt 4 to open the door, as mentioned previously.

In addition to being locked or unlocked electronically by remote, button, switch, keypad, or cell phone app; or manually from inside, compact powered door latch 1 may also be manually locked and unlocked by key from outside, as mentioned before. As shown in FIG. 2, cylinder 28, which may accept a key from the exterior side, may be used to manually lock and unlock compact powered door latch 1. Cylinder 28 through arm 30 may be held in a neutral position by springs 32 and 34, as previously mentioned and shown in FIG. 2. Also as previously mentioned, arm 30 may have a "C" shaped edge that, when in neutral position as shown in FIGS. 2-4, encompasses a certain range of motion of portions of connector 26 and catch 18 (i.e., those portions of connector 26 and catch 18 that are enclosed by portions of arm 30) and may allow compact powered door latch 1 to be placed in either locked or unlocked positions or transition between them. This design allows free movement within the bounds of arm 30 of catch 18, solenoid 20, connector 22, lever 24, and connector 26, which may all be interconnected. These components that may be used to electronically lock or unlock or manually lock or unlock from inside compact powered door latch 1 may move without requiring cylinder 28, arm 30, and springs 32 and 34 to move as well, when these components remain in a neutral position. However, with a key inserted into keyhole 36 in frame piece 14, as shown in FIG. 1, cylinder 28 may be allowed to turn to lock or unlock compact powered door latch 1 by causing the internal components that are used to lock or unlock compact powered door latch 1 to move. With a key inserted into keyhole 36 and turned clockwise (when looking at compact powered door latch 1 from outside, as shown in FIG. 1) cylinder 28 will also turn (clockwise when facing compact powered door latch 1 from outside and counterclockwise when facing compact powered door latch 1 from inside). When looking at compact powered door latch 1 from inside, as shown in FIGS. 2 to 13, a counterclockwise turn of cylinder 28 may cause compact powered door latch 1 to lock and a clockwise turn of cylinder 28 may cause compact powered door latch 1 to unlock.

Figure 6:
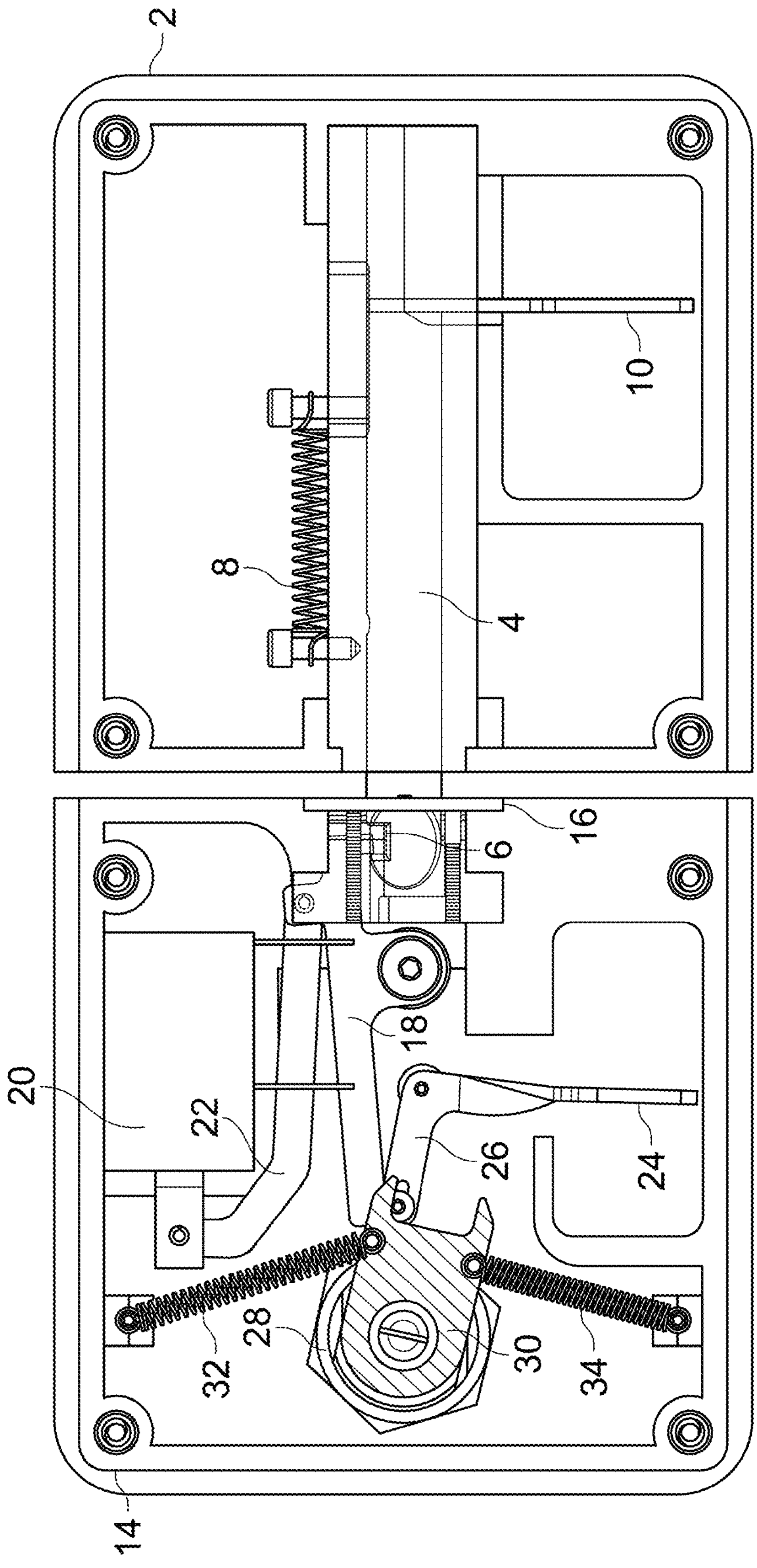
FIG. 6 shows an interior prospective view of the inside of the exemplary compact powered door latch of FIG. 1 in a first transition from locked to unlocked position by use of a key.
Figure 7:
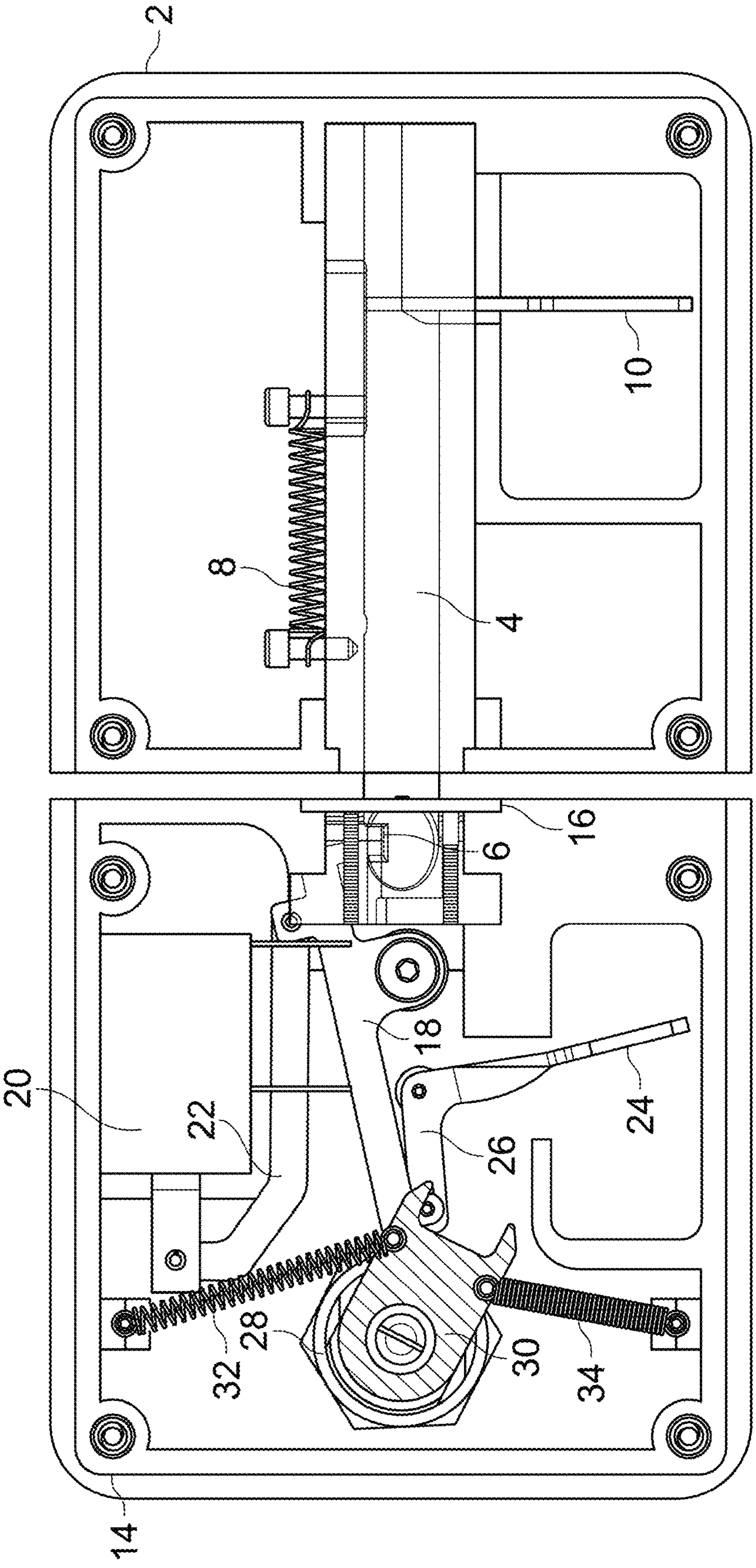
FIG. 7 shows an interior prospective view of the inside of the exemplary compact powered door latch of FIG. 1 in a second transition from locked to unlocked position by use of a key.
Figure 8:
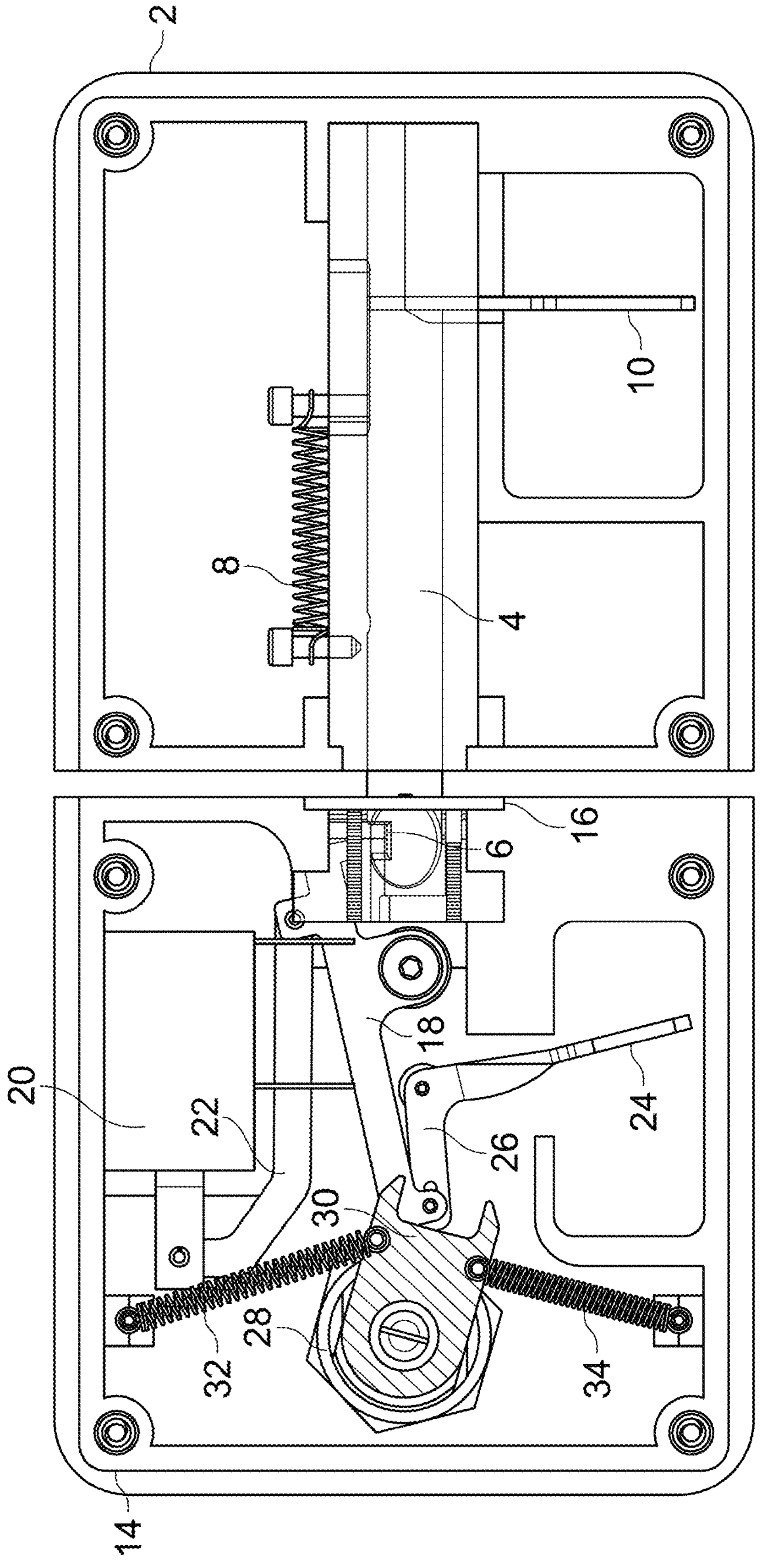
FIG. 8 shows an interior prospective view of the inside of an exemplary compact powered door latch of FIG. 1 in a third transition from locked to unlocked position by use of a key.

As shown in a first transition in FIG. 6, a clockwise turn of cylinder 28 may cause arm 30 to rotate downward, pulling portions of connector 26 and catch 18 down, which may begin the release of catch 18 from notch 6 in bolt 4. With arm 30 at its lowest position, as shown in a second transition in FIG. 7, catch 18 may be fully released from notch 6 in bolt 4. As shown in transition in FIGS. 6 and 7, catch 18, solenoid 20, connector 22, lever 24, and connector 26 will all transition into their unlocked positions by cylinder 28 as arm 30 rotates downward. When the key inserted into keyhole 36 is released, spring 32 may return arm 30 and cylinder 28 to their neutral positions, as shown in transition in FIG. 8, without any further movement of catch 18, solenoid 20, connector 22, lever 24 and connector 26, allowing them to remain in their unlocked positions. With bolt 4 free of catch 18, compact powered door latch 1 is in unlocked position and bolt 4 may be retracted out of frame piece 14 using lever 10 or handle 12 in door piece 2, as shown in transition in FIG. 12, to allow opening of the door.

Figure 9:
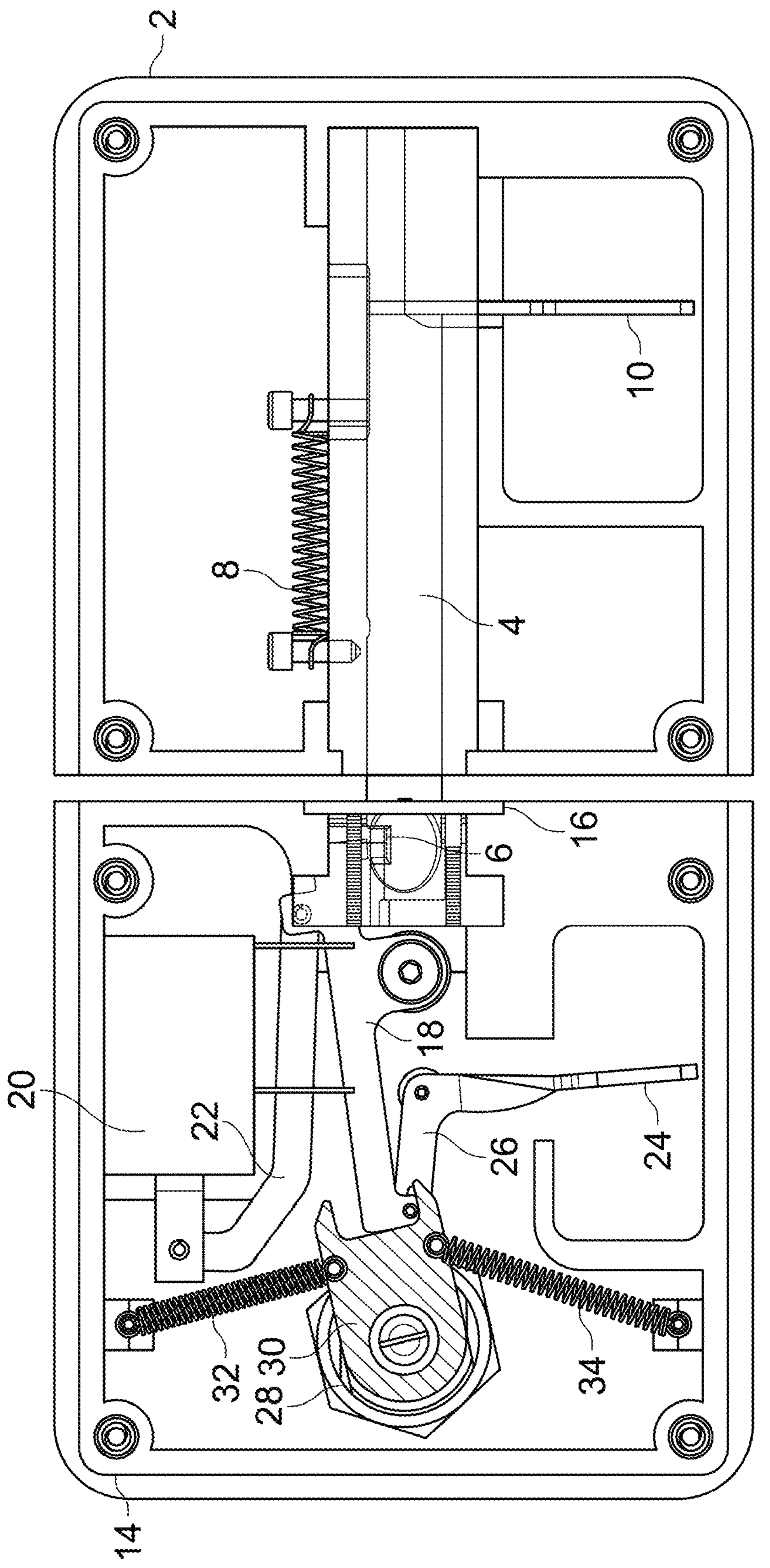
FIG. 9 shows an interior prospective view of the inside of the exemplary compact powered door latch of FIG. 1 in a first transition from unlocked to locked position by use of a key.
Figure 10:
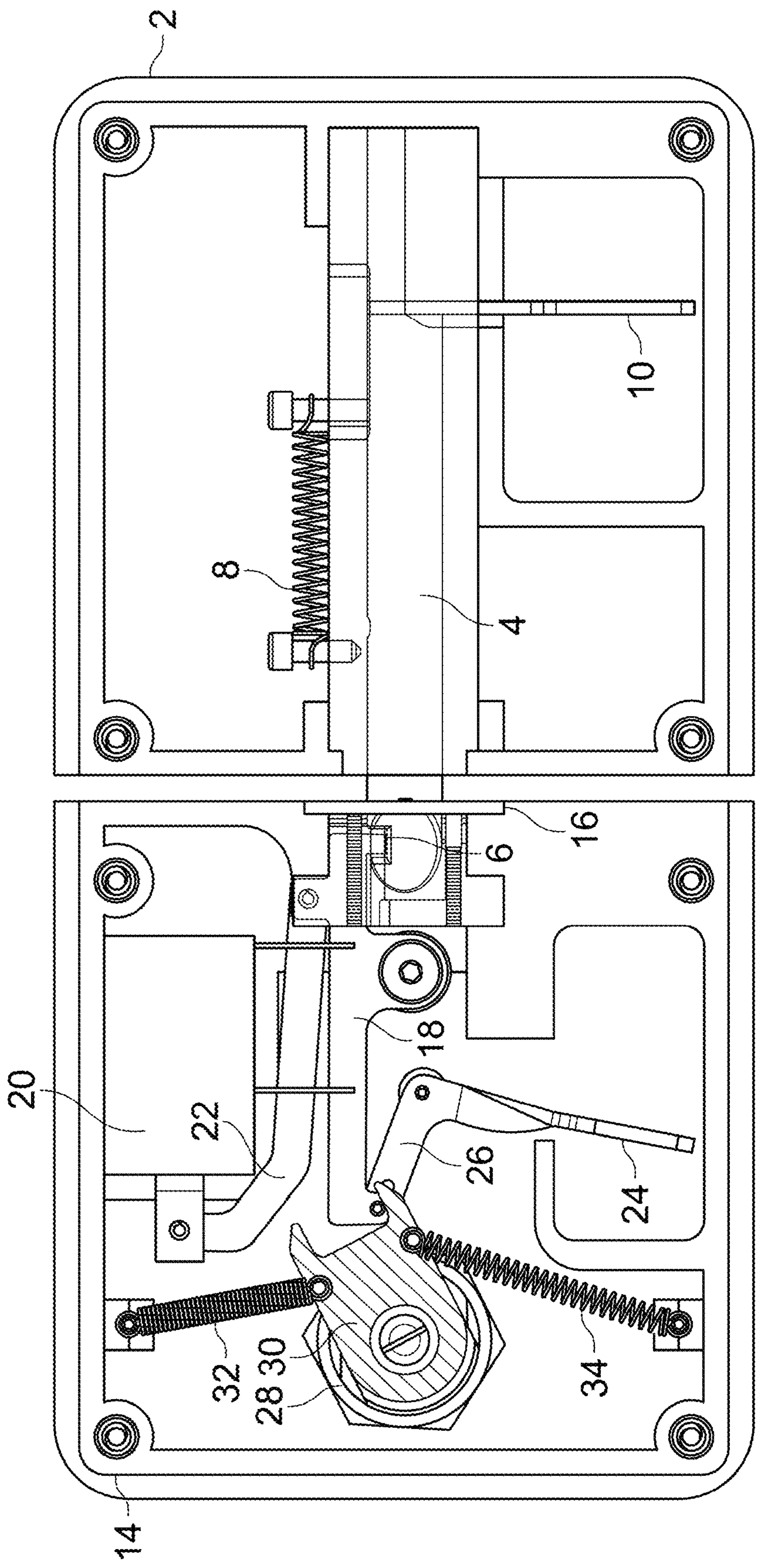
FIG. 10 shows an interior prospective view of the inside of the exemplary compact powered door latch of FIG. 1 in a second transition from unlocked to locked position by use of a key.
Figure 11:
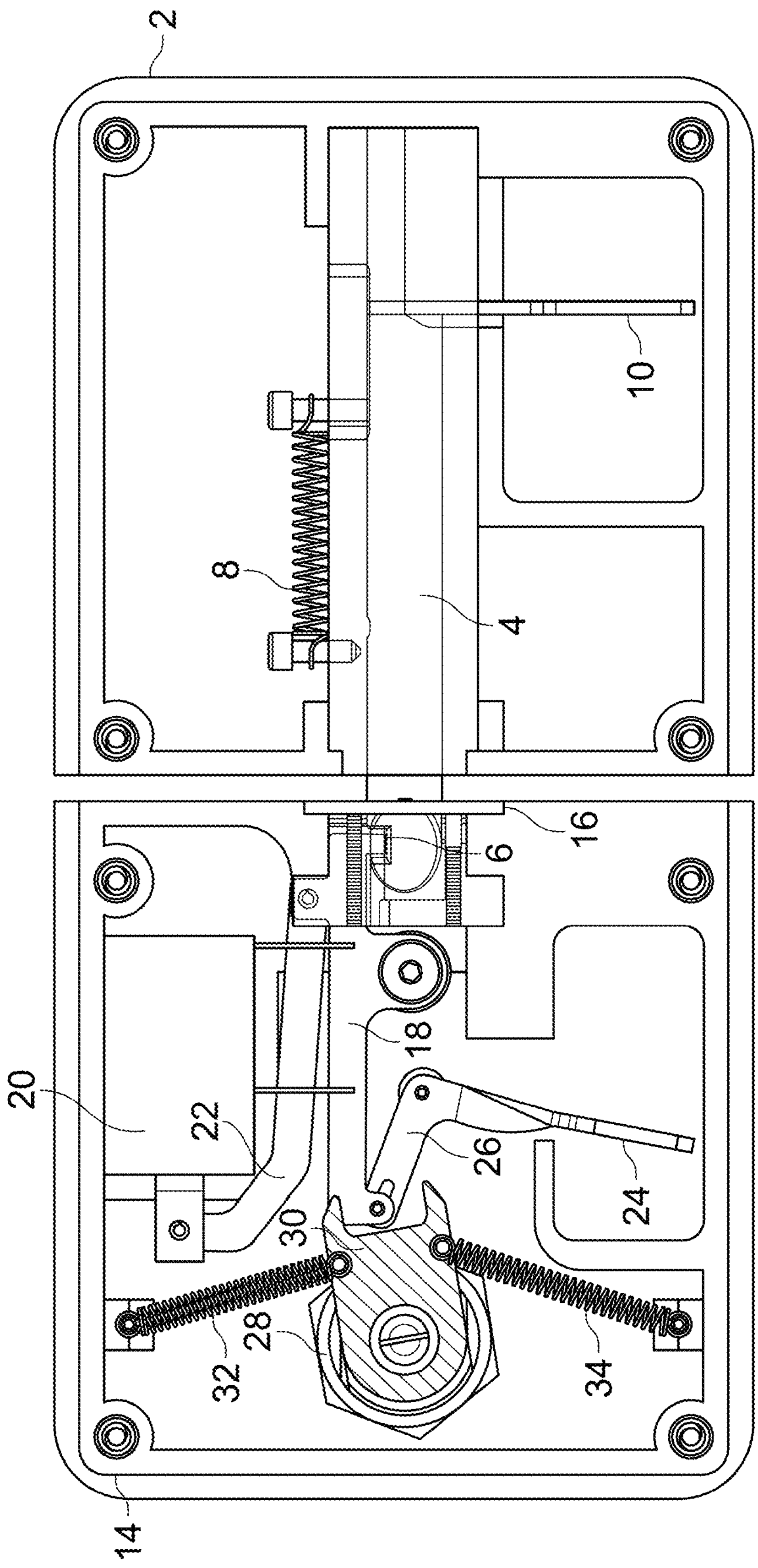
FIG. 11 shows an interior prospective view of the inside of the exemplary compact powered door latch of FIG. 1 in a third transition from unlocked to locked position by use of a key.
Figure 12:
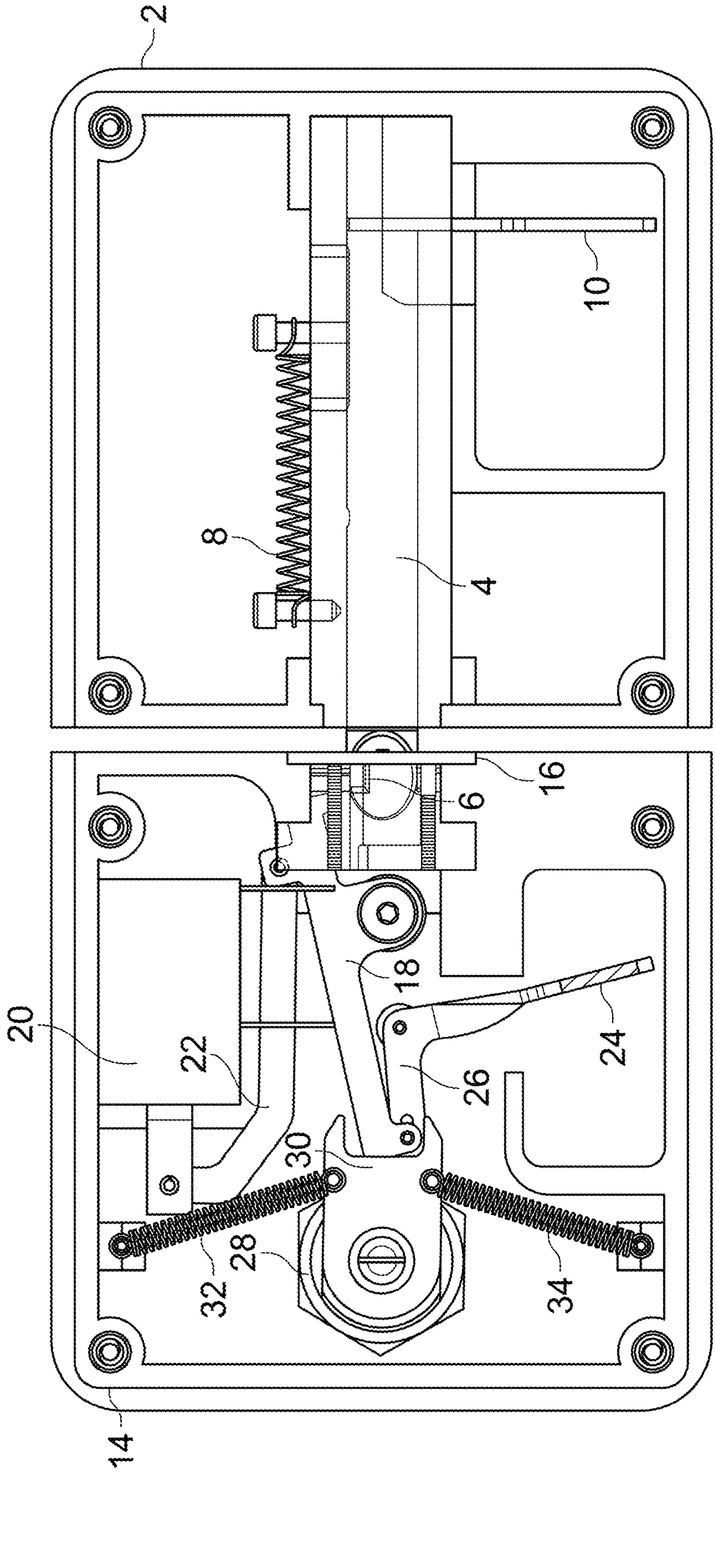
FIG. 12 shows an interior prospective view of the inside of the exemplary compact powered door latch of FIG. 1 in transition from latched to unlatched position.
Figure 13:
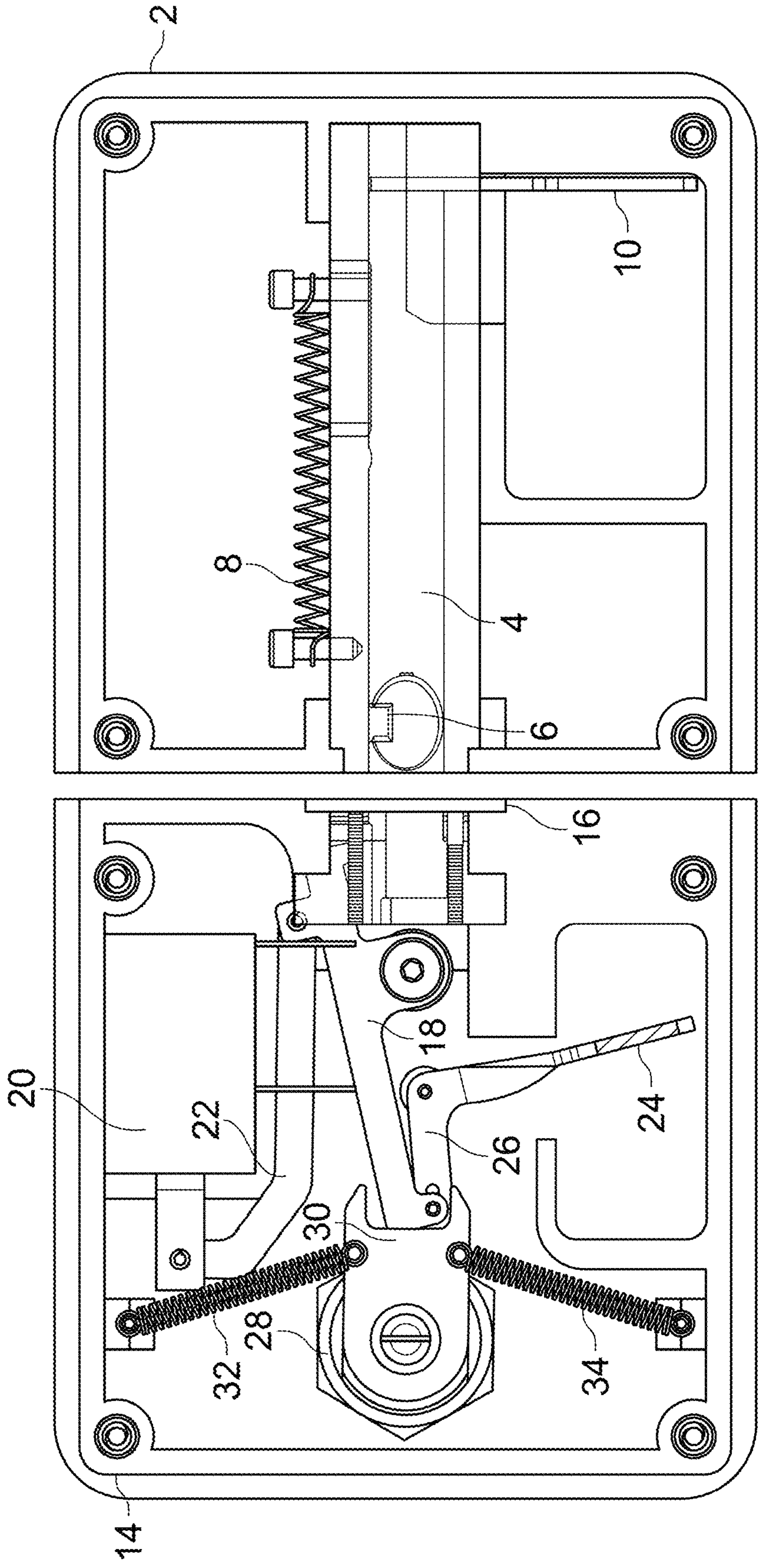
FIG. 13 shows an interior prospective view of the inside of the exemplary compact powered door latch of FIG. 1 in unlatched position.

As shown in a first transition in FIG. 9, a counterclockwise turn of cylinder 28 may cause arm 30 to rotate upward, pulling portions of connector 26 and catch 18 up, which may cause catch 18 to begin to enter notch 6 in bolt 4, With arm 30 at its highest position, as shown in a second transition in FIG. 10, catch 18 will have fully entered notch 6 in bolt 4. As shown in transition in FIGS. 9 and 10, catch 18, solenoid 20, connector 22, lever 24, and connector 26 will all transition into their locked positions by cylinder 28 as arm 30 rotates upward. When the key inserted into keyhole 36 is released, spring 34 may return arm 30 and cylinder 28 to their neutral positions, as shown in transition in FIG. 11, without any further movement of catch 18, solenoid 20, connector 22, lever 24, and connector 26, allowing them to remain in their locked positions. With bolt 4 held captive by catch 18, compact powered door latch 1 is in locked position, as previously shown in FIG. 2 and bolt 4 may not be retracted out of Frame piece 14 using lever 10 or handle 12 on door piece 2 to open the door.

What is claimed is:

1. A door latch comprising:
- a frame piece comprising:
  - a lever comprising a lever connector;
  - an actuator comprising an actuator connector;
  - a cylinder comprising an arm; and
  - a catch configured to be moved by the lever connector, the actuator connector and the arm, and
- a door piece comprising;
  - a bolt configured to laterally slide between the frame piece and the door piece, thereby transitioning the door latch between an unlatched position and a latched position;

wherein the lever is configured to cause the catch to move, wherein the actuator is configured to cause the catch to move, wherein the cylinder is configured to cause the catch to move wherein in the latched position, when the catch is moved to prevent the bolt from laterally moving, the door latch is transitioned from an unlocked position to a locked position, and wherein in the latched position, when the catch is moved to allow the bolt to laterally move, the door latch is transitioned from the locked position to the unlocked position.

2. The door latch of claim 1, wherein the lever connector is pivotally connected to the frame piece.

3. The door latch of claim 1, wherein the actuator is connected to the frame piece.

4. The door latch of claim 1, wherein the catch is pivotally connected to the frame piece.

5. The door latch of claim 1, wherein the catch is configured to be pivotally connected to the lever connector and the actuator connector.

6. The door latch of claim 1, wherein each of the lever, the actuator and the cylinder is independently configured to cause the catch to pivot upward and downward.

7. The door latch of claim 6, wherein the cylinder has a notch, a grave, or a hole.

8. The door latch of claim 7, wherein in the latched position, when the catch pivots downward and thus fits into the notch, the grave, or the hole to prevent the bolt from laterally moving, the door latch is transitioned from an unlocked position to a locked position.

9. The door latch of claim 1, wherein the actuator is a solenoid actuator.

10. The door latch of claim 1, wherein the cylinder is a keyed cylinder.

11. The door latch of claim 1, wherein the actuator is an electronic actuator with a rod at one end of the actuator capable of linear movement when a current is applied to the actuator.

12. The door latch of claim 1, wherein the applied current causes the rod to move laterally, thereby causing the catch to move through the actuator connector.

13. The door latch of claim 1, wherein the cylinder is configured to be forced to rotate the arm, thereby causing the catch to move.

14. The door latch of claim 1, wherein the frame piece further comprises a spring that is configured to cause the arm to rest in a neutral position when no force is exerted on the cylinder.

15. The door latch of claim 1, wherein the lever is configured to be manually moved laterally to cause the catch to move through the lever connector.

16. The door latch of claim 1, wherein the bolt further comprises an interior handle and an exterior handle to laterally move the bolt.

17. The door latch of claim 1, wherein the bolt is attached to the door piece by a spring to slide laterally the bolt from a latched position to an unlatched position.

18. A door latch comprising:
- a frame piece comprising:
  - a lever comprising a lever connector;
  - an actuator comprising an actuator connector;
  - a cylinder comprising an arm; and
  - a catch configured to be moved by the lever connector, the actuator connector and the arm, and
- a door piece comprising;
  - a bolt configured to laterally slide between the frame piece and the door piece, thereby transitioning the door latch between an unlatched position and a latched position;

wherein the lever is configured to cause the catch to pivot upward and downward, wherein the actuator is configured to cause the catch to pivot upward and downward, wherein the cylinder is configured to cause the catch to pivot upward and downward, wherein in the latched position, when the catch pivots downward to prevent the bolt from laterally moving, the door latch is transitioned from an unlocked position to a locked position, and wherein in the latched position, when the catch pivots upward to allow the bolt to laterally move, the door latch is transitioned from the locked position to the unlocked position.

19. The door latch of claim 18, wherein the bolt comprises a notch, a groove, or a hole; and wherein in the latched position, when the catch pivots downward and thus fits into the notch, the groove, or the hole to prevent the bolt from laterally moving, the door latch is transitioned from the unlocked position to the locked position.

20. A door latch comprising:

a frame piece comprising:

a lever comprising a lever connector;

an actuator comprising an actuator connector;

a cylinder comprising an arm; and a catch configured to be moved by the lever connector, the actuator connector and the arm, and a door piece comprising;

a bolt comprising a notch, a groove, or a hole and configured to laterally slide between the frame piece and the door piece, thereby transitioning the door latch between an unlatched position and a latched position;

wherein the lever is configured to cause the catch to pivot upward and downward, wherein the actuator is configured to cause the catch to pivot upward and downward, wherein the cylinder is configured to cause the catch to pivot upward and downward, wherein in the latched position, when the catch pivots downward and thus fits into the notch, the groove, or the hole to prevent the bolt from laterally moving, the door latch is transitioned from an unlocked position to a locked position, and wherein in the latched position, when the catch pivots upward to allow the bolt to laterally move, the door latch is transitioned from the locked position to the unlocked position.

21. A door latch comprising:

a frame piece comprising:

a lever comprising a lever connector pivotally connected to the frame piece;

an actuator comprising an actuator connector, the actuator being connected to the frame piece;

a cylinder comprising an arm; and a catch pivotally connected to the frame piece, configured to be pivotally connected to the lever connector and the actuator connector, and configured to be constrained by the arm, and a door piece comprising;

a bolt comprising a notch, a groove, or a hole and configured to laterally slide between the frame piece and the door piece, thereby transitioning the door latch between an unlatched position and a latched position;

wherein the lever is configured to cause the catch to pivot upward and downward, wherein the actuator is configured to cause the catch to pivot upward and downward, wherein the cylinder is configured to cause the catch to pivot upward and downward, wherein in the latched position, when the catch pivots downward and thus fits into the notch, the groove, or the hole to prevent the bolt from laterally moving, the door latch is transitioned from an unlocked position to a locked position, and wherein in the latched position, when the catch pivots upward to allow the bolt to laterally move, the door latch is transitioned from the locked position to the unlocked position.

* * * * *